(12) United States Patent
Peterson

(10) Patent No.: US 11,831,791 B2
(45) Date of Patent: Nov. 28, 2023

(54) SYSTEM AND METHOD FOR APPROVING TRANSACTIONS

(71) Applicant: OL SECURITY LIMITED LIABILITY COMPANY, Wilmington, DE (US)

(72) Inventor: Robert W. Peterson, Plano, TX (US)

(73) Assignee: OL SECURITY LIMITED LIABILITY COMPANY, Wilmington, DE (US)

(*) Notice: Subject to any disclaimer, the term of this patent is extended or adjusted under 35 U.S.C. 154(b) by 0 days.

(21) Appl. No.: 17/206,689

(22) Filed: Mar. 19, 2021

(65) Prior Publication Data

US 2021/0211311 A1    Jul. 8, 2021

Related U.S. Application Data

(60) Continuation of application No. 15/828,089, filed on Nov. 30, 2017, now abandoned, which is a division of
(Continued)

(51) Int. Cl.
*G06Q 20/00*    (2012.01)
*H04L 9/32*    (2006.01)
(Continued)

(52) U.S. Cl.
CPC ......... *H04L 9/3271* (2013.01); *G06Q 20/085* (2013.01); *G06Q 20/3224* (2013.01);
(Continued)

(58) Field of Classification Search
CPC ............... H04L 9/3271; H04L 2209/56; H04L 2209/80; H04L 63/0853; H04W 4/029;
(Continued)

(56) References Cited

U.S. PATENT DOCUMENTS 6,612,488 B2 * 9/2003 Suzuki ................... G06Q 20/40
235/380
2001/0034707 A1   10/2001 Sakaguchi
(Continued)

FOREIGN PATENT DOCUMENTS

CN    1954335    4/2007
JP    2004240725    8/2004
(Continued)

OTHER PUBLICATIONS

Foreign Ref. Attached (Year: 2006).*
(Continued)

*Primary Examiner* — Dante Ravetti
(74) *Attorney, Agent, or Firm* — Schwabe, Williamson & Wyatt, P.C.

(57) ABSTRACT

In a transaction between a merchant and a payer, approval of the transaction may be provided by a payment processing system using authentication information provided from a mobile device of the payer. The authentication information may include a location of the payer mobile device which may be compared to a location of a merchant payment device such that the transaction is approved if the payer mobile device is within a defined distance of the merchant payment device.

12 Claims, 5 Drawing Sheets

Related U.S. Application Data application No. 12/629,937, filed on Dec. 3, 2009, now abandoned.

(51) Int. Cl.

| | | |
|---|---|---|
| *H04W 4/029* | (2018.01) | |
| *G06Q 20/08* | (2012.01) | |
| *G06Q 20/32* | (2012.01) | |
| *G06Q 20/40* | (2012.01) | |
| *G06Q 30/0601* | (2023.01) | |
| *G06Q 40/12* | (2023.01) | |
| *H04L 9/40* | (2022.01) | |

(52) U.S. Cl.
CPC ......... *G06Q 20/40* (2013.01); *G06Q 30/0603* (2013.01); *G06Q 40/12* (2013.12); *H04W 4/029* (2018.02); *H04L 63/0853* (2013.01); *H04L 2209/56* (2013.01); *H04L 2209/80* (2013.01)

(58) Field of Classification Search
CPC ....... H04W 4/02; G06Q 40/12; G06Q 20/085; G06Q 20/32; G06Q 20/3224; G06Q 20/40; G06Q 30/0603
USPC .......................... 705/16, 21, 59; 380/44, 262
See application file for complete search history.

(56) References Cited

U.S. PATENT DOCUMENTS

| | | | |
|---|---|---|---|
| 2002/0013815 A1* | 1/2002 | Obradovich ............ H04L 51/42 | |
| | | | 715/744 |
| 2002/0066042 A1* | 5/2002 | Matsumoto ........... G07F 7/1008 | |
| | | | 726/7 |
| 2003/0182194 A1 | 9/2003 | Choey et al. | |
| 2004/0019564 A1 | 1/2004 | Goldthwaite et al. | |
| 2004/0087339 A1* | 5/2004 | Goldthwaite ........ G06Q 20/341 | |
| | | | 455/558 |
| 2004/0215963 A1 | 10/2004 | Kaplan | |
| 2004/0254868 A1 | 12/2004 | Kirkland et al. | |
| 2007/0011099 A1 | 1/2007 | Sheehan | |
| 2007/0022058 A1 | 1/2007 | Labrou et al. | |
| 2007/0174082 A1 | 7/2007 | Singh | |
| 2007/0184818 A1 | 8/2007 | Clough | |
| 2008/0077534 A1 | 3/2008 | Son | |
| 2008/0162346 A1* | 7/2008 | Aaron ................. H04W 12/126 | |
| | | | 705/44 |
| 2008/0183622 A1 | 7/2008 | Dixon et al. | |
| 2008/0222038 A1 | 9/2008 | Eden et al. | |
| 2008/0319914 A1 | 12/2008 | Carrott | |
| 2009/0094126 A1* | 4/2009 | Killian ................... G06Q 40/02 | |
| | | | 705/17 |
| 2009/0106160 A1* | 4/2009 | Skowronek ........ G06Q 20/3278 | |
| | | | 705/75 |
| 2009/0113205 A1 | 4/2009 | Abaton | |
| 2009/0143104 A1 | 6/2009 | Loh et al. | |
| 2009/0206157 A1 | 8/2009 | Heffez et al. | |
| 2009/0222891 A1 | 9/2009 | Heffez | |
| 2009/0265552 A1 | 10/2009 | Moshir et al. | |
| 2010/0332267 A1* | 12/2010 | Etchegoyen ........... G06Q 30/06 | |
| | | | 705/26.1 |
| 2011/0137804 A1 | 6/2011 | Peterson | |
| 2014/0200957 A1 | 7/2014 | Biggs | |

FOREIGN PATENT DOCUMENTS

| | | | |
|---|---|---|---|
| JP | 2005229278 | 8/2005 | |
| JP | 2006164035 | 6/2006 | |
| JP | 2007521586 | 8/2007 | |
| KR | 20010110280 | 12/2001 | |
| KR | 20040078954 | 9/2004 | |
| KR | 20060025495 | 3/2006 | |
| WO | 2005067402 | 7/2005 | |
| WO | WO-2006022513 A1 * | 3/2006 | ............ G06Q 20/12 |
| WO | 2006109574 | 10/2006 | |
| WO | 2011068624 | 6/2011 | |

OTHER PUBLICATIONS

Korean Intellectual Property Office; English abstract, KR 10-2004-0078954; published Sep. 14, 2004; 2 pages.
Patent abstracts of Japan; JP patent Office Publication No. 2006-164035; NEC Corp .; Jun. 22, 2006; 1 Page.
Patent abstracts of Japan; JP patent Office Publication No. 2004-240725; Mitsubishi Electric Corp .; Aug. 26, 2004; 1 Page.
Patent abstracts of Japan; JP Patent Office Publication No. 2005-229278; Fuji Photo Film Co. Ltd .; Aug. 25, 2005; 1 page.
European Patent Office; IB International Preliminary Report on Patentability and Written Opinion of the ISA; PCT/US2010/055620; dated Jun. 14, 2012; 10 pages.
KIPO; International Search Report; PCT/US2010/055620; dated Aug. 25, 2011; 3 pages.
European Patent Office; EP 10779606.2 Search Report; dated Mar. 2, 2017; 8 pages.

* cited by examiner

US 11,831,791 B2

SYSTEM AND METHOD FOR APPROVING TRANSACTIONS

CROSS REFERENCE TO RELATED APPLICATIONS

This application is continuation of U.S. application Ser. No. 15/828,089, filed Nov. 30, 2017, which is a divisional of U.S. application Ser. No. 12/629,937, filed on Dec. 3, 2009, each disclosure of which is herein incorporated by reference in its entirety.

FIELD OF THE INVENTION

This disclosure relates to systems and methods for approving commercial transaction such as transactions between a merchant and a payer. In particular, though not exclusively, the disclosure relates to transactions involving credit cards, debit cards, and the like.

BACKGROUND OF THE INVENTION

With the exception of cash transactions, most commercial transactions between a merchant and a customer typically use some form of payment identification device such as a credit card, debit card, loyalty card, or the like. Such transactions require approval by the administrator or provider of the payment identification card. Approval may be provided by various means such as a personal identification number, password, or presence of a physical payment authorization device (e.g., credit card). These solutions don't deal effectively with some classes of fraud, such as counterfeit credit cards, and use of a real card using a fraudulent merchant account. In particular, a person frequently traveling to foreign countries must either notify the institution issuing the card before every trip or forgo the crude default protection of disallowing transactions originating in a foreign country.

What is required is an improved system and method for identifying fraudulent attempts to use a payment authorization device based on the location of the device.

SUMMARY OF THE INVENTION

In one aspect of the disclosure, there is provided a method for approving a transaction between a merchant payment device of a merchant and a payer identification device of a payer. The method comprises identifying the payer from the payer identification device at the merchant payment device, identifying a mobile communications device of the payer, communicating with the mobile communications device to receive a communication from the mobile communications device which indicates authentication data, and determining an approval for the transaction from the authentication data.

In one aspect of the disclosure, there is provided a payment processing system for approving a transaction between a merchant payment device of a merchant and a payer identification device of a payer. The payment processing system may be configured to receive a transaction record that indicates the payer identification device and the merchant payment device. The payment processing system may also be configured to analyze authentication data from a mobile communications device of the payer, approve the transaction using the authentication data, and indicate the approval of the transaction to the merchant payment device.

In one aspect of the disclosure, there is provided a computer-readable medium comprising computer executable instructions for execution by a processor of a device, that, when executed, cause the processor to read a payment identification device of a payer, identify a mobile communications device of the payer, request authentication information from the mobile communications device, receive the authentication information from the mobile communications device, generate a transaction record incorporating the authentication information, and provide the transaction record to a payment processing system.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
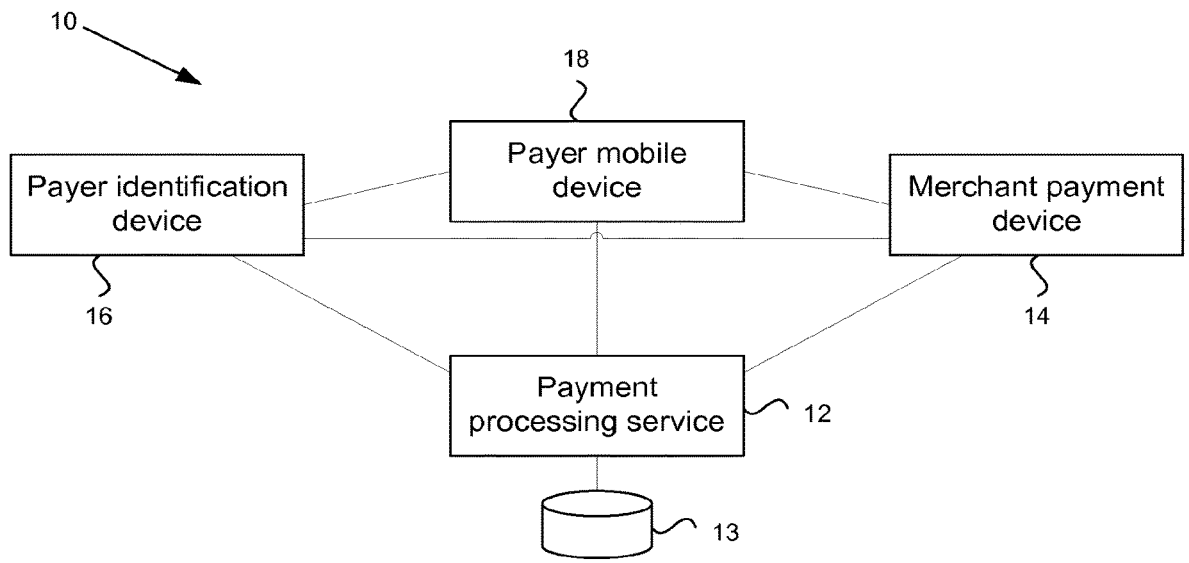
FIG. 1 illustrates components of a transaction system of the present disclosure.

A system 10 in accordance with an embodiment of the disclosure is illustrated in FIG. 1. In the system 10, there is provided a payment processing system 12 that interacts with a merchant payment device 14 through known communications protocols such as TCP/IP, FTP, EFTPOS etc. During a transaction, a payer, e.g., a customer, may identify a payer identification device 16 to the transaction. The payer identification device may be a credit card, debit card, or other form of account identifier, which in some embodiments, may include a mobile telecommunications device. The merchant payment device 14 (e.g., a credit card reader, a Bluetooth radio) is able to extract from the payer identification device 16 sufficient information, e.g., account number or card number, to pay the merchant. The merchant payment device 14 may communicate the payer information to the payment processing system 12 for verification. The payment processing system 12 may include a database 13 which stores payer identification including payer name, contact details, account information, credit limit and other required information for verifying transactions of the payer. In any typical legitimate transaction between the payer and the merchant, a mobile telecommunications device 18 of the payer will be available. In an embodiment of the disclosure, the ubiquitous nature of mobile devices is taken into account so that the payer's mobile device can be used in the transaction as an additional verification tool.

Figure 2:
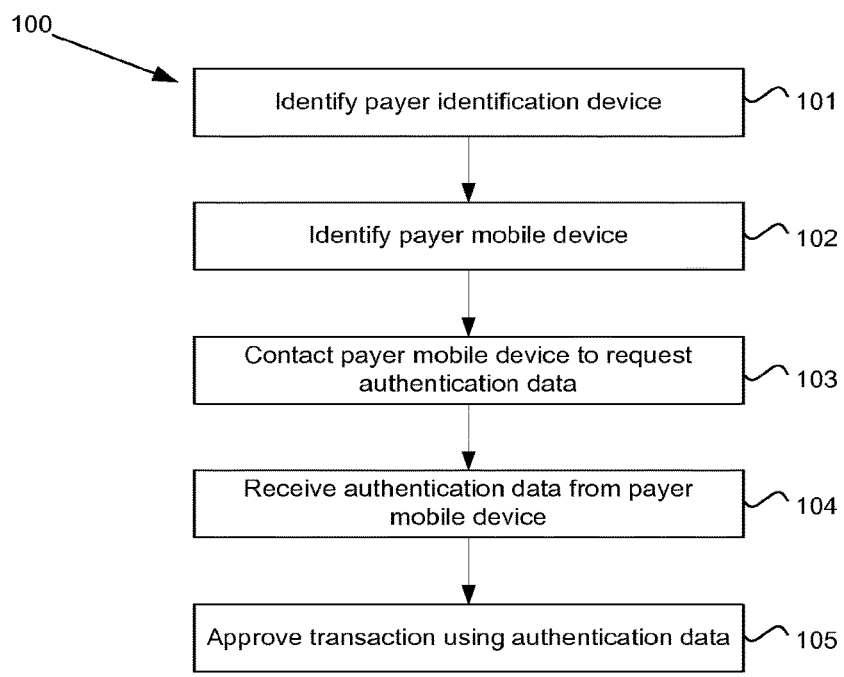
FIG. 2 illustrates a method for approving a transaction.

A method for verifying a transaction using a payer's mobile device is shown in the, flowchart 100 of FIG. 2. At step 101, the merchant payment device 14 scans, reads or otherwise identifies the payer identification device 16. At step 102, a mobile communications device 18 of the payer is identified, e.g., from data associated with the payer identification device 16, or from other data provided at the transaction, e.g., by communication direct from the payer. The merchant payment device 14 contacts the payer mobile device 18 to request authentication data (step 103) which is received at step 104. The authentication data is then used to determine an approval for the transaction (step 105), e.g., by providing the authentication data to a payment processing system 12.

The authentication data may take several forms, including the location of the payer mobile device or previous transaction history of the payer, known to the payer mobile device, which may or may not be known to the merchant payment device.

The authentication data may be provided from the payer mobile device to the payment processing service or to the merchant payment device and via any necessary intermediaries such as routers, network providers and the like.

The method described in FIG. 2 may be used to tie validation and authorization of a payment transaction to the locations of the entities involved. That is, the method may extend transaction authorization to include geolocation information. If the payer identification device 16 (credit card, debit card, cell phone acting as a credit card, etc.) is present, the geolocation of the payer mobile device 18 is compared during the card processor's authorization processing to other geolocation information, such as the location of the merchant's store, to establish that the person authorized to execute the transaction is in approximately the same location as the payer identification device 16. In simple terms, if the authorized card holder isn't near the card reader, the transaction should either be declined or additional identity confirmation should be conducted.

Figure 3:
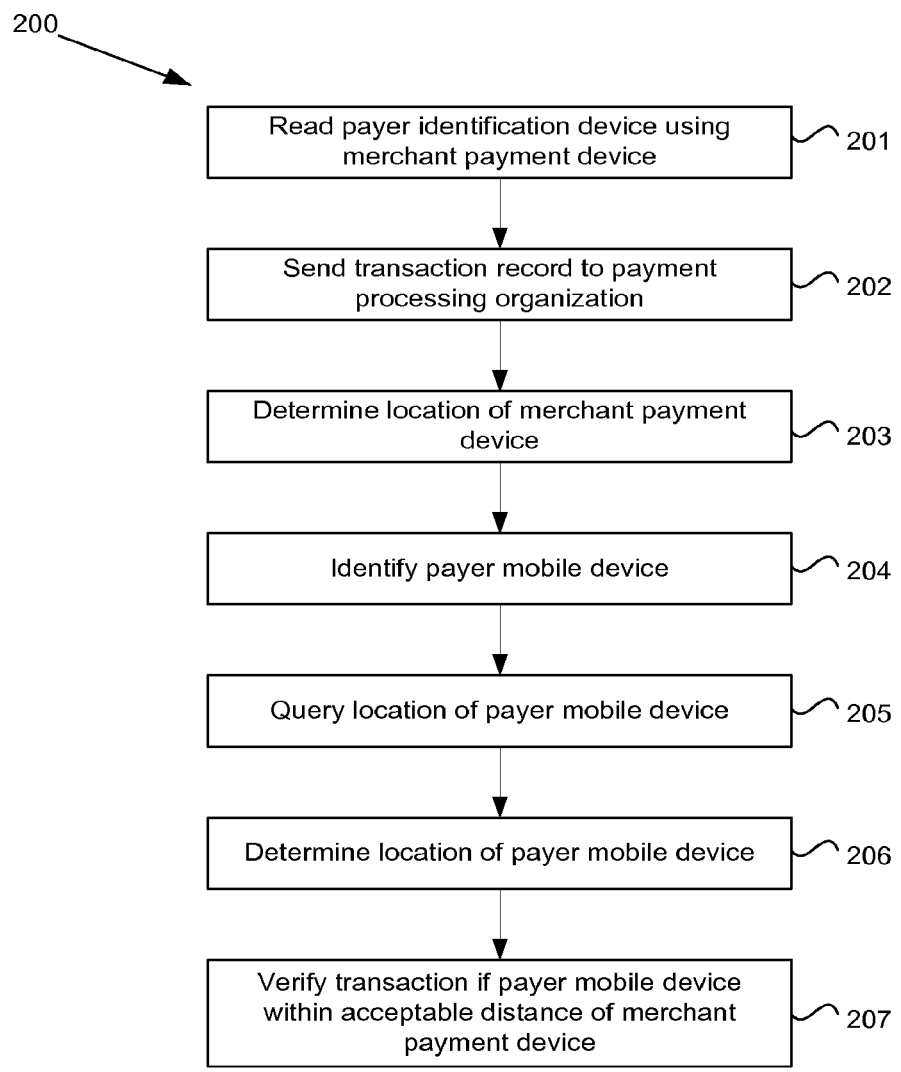
FIG. 3 illustrates a method for approving a transaction using location data of a payer mobile device.

In one embodiment, illustrated in the flowchart 200 of FIG. 3, the merchant payment device 14 may be used to read the payer identification device 16 to pay a merchant (step 201). The merchant payment device 14 sends to the payment processing system 12 a transaction record (step 202) which identifies the payer identification device 16, the merchant payment device 14 and other details of the transaction such as the amount, time, etc. The transaction record maybe used to determine a geolocation of the merchant payment device (step 203). In one embodiment, the location of the merchant payment device 14 may be known locally in the payment processing system 12, e.g., stored in a local database 13, and may be retrieved from the database 13 using an identity of the merchant or the merchant payment device 14. In an alternative embodiment, in particular where the merchant payment device 14 may be mobile, the transaction record may include the geolocation of the merchant payment device 14, e.g., as determined by an internal GPS system of the merchant payment device 14 or other location determination system.

At step 204, the merchant payment device 14 may identify the mobile communications device 18 and request the current location of the mobile communications device 18 (step 205) which is received at step 206 and added to the transaction record. In an alternative embodiment, the database 13 of the payment processing system 12 may store contact details for the mobile communications device 18 such that steps 204, 205, 206 are performed by the payment processing system once the payer has been identified from the transaction record.

In one embodiment, the payer mobile device 18 may provide location information without user input. In an alternative embodiment, a message, such as an SMS message may be sent to the payer's mobile device 18, requiring an SMS response from the payer, with the location of the payer mobile device 18 being extracted from the response SMS message. If the payer mobile device 18 is within an acceptable distance from the location reported by the merchant payment device 14, the merchant payment device 14 is sent a message approving the transaction (step 207). The acceptable distance may depend on the transaction environment. For example, transactions with merchants where the payer may often be in a car, such as in a drive-through premises, may allow a greater distance than transactions where customers are generally slower or more stationary. Typical allowable distances are considered to be 100 feet for a casual restaurant, 20 feet for a retail store, and 10 feet for a fast food restaurant. The typical distance for each merchant is stored in the Payment Processing Service database 13.

In one embodiment, the transaction record may be complete when first sent from the merchant payment device 14 to the payment processing system 12. This has the advantage that a location of the mobile communications device 18 and the merchant payment device 14 are known at the immediate time of the transaction. However, the transaction record may also be sent in multiple stages. For example, the payment processing system 12 may separately query the merchant payment device 14 for its current location, which the merchant payment device 14 may add to the transaction record in response to the query.

Figure 4:
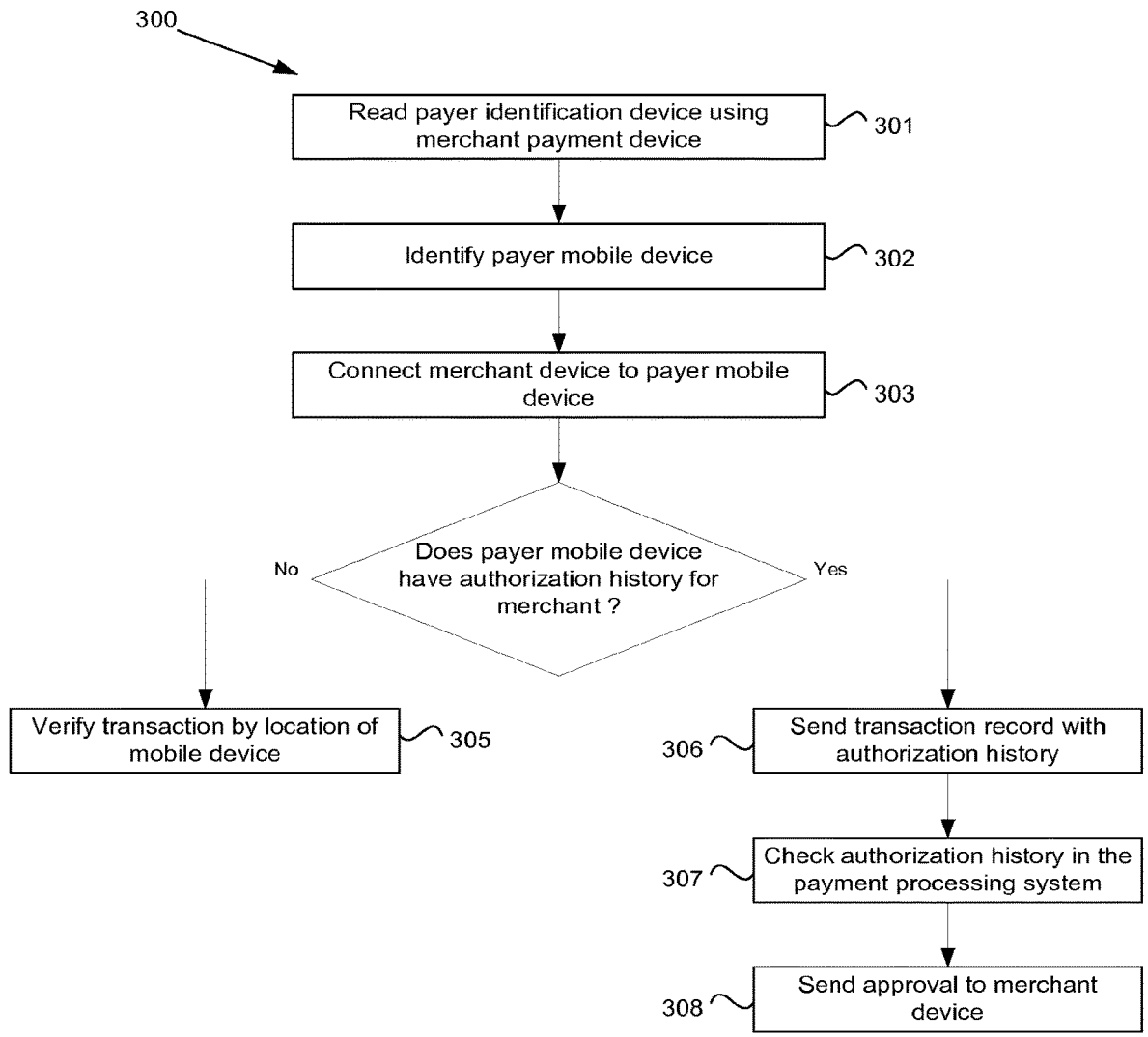
FIG. 4 illustrates a method for approving a transaction using transaction history known to a payer mobile device.

In one embodiment illustrated in the flowchart 300 of FIG. 4, the merchant payment device 14 is used to read the payer identification device to pay a merchant (step 301). The merchant payment device 14 looks for the payer mobile device 18 (step 302) (e.g., cell phone, PDA, MID, etc.) and connects to the payer mobile device 18 (step 303), which communicates a previous transaction history, such as an authentication history for the merchant payment device 14 (step 304). If the payer mobile device 18 is not present or the registration check fails, the transaction requires additional verification before being accepted. The merchant payment device 14 sends the transaction record to the payment processing service 12 indicating that the payment processing system 18 can verify the transaction (step 305) by contacting the payer mobile device 18 using the process illustrated in FIG. 3 (from step 203). If the merchant payment device 14 verifies at step 304 that the payer identification device 16 has been previously authorized by the payer mobile device 18 for the merchant, the merchant payment device indicates the authorization history in the transaction record to the payment processing service. The payment processing service 12 processes the transaction, include checking the authorization history. If the validations succeed, the payment processing service 12 sends to the merchant payment device 14 a message approving the transaction (step 308). In embodiments such as this, e.g., where independent location verification is not necessarily used in the authentication step, it is conceivable that the payment identification device 16 and the payer mobile device 18 may be merged into a single device.

Figure 5:
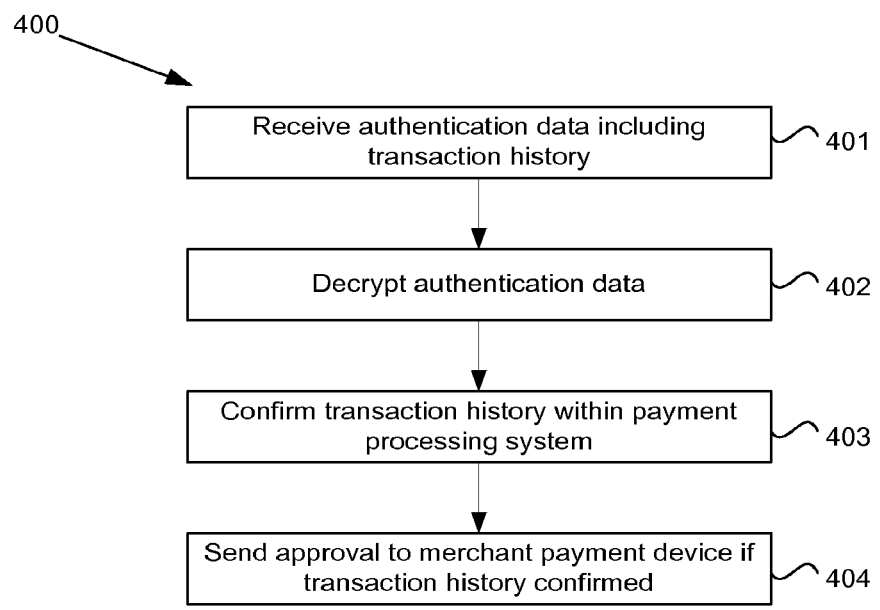
FIG. 5 illustrates a payment processing system process.

In one embodiment, the mobile communications device may provide additional authentication information that is unknown to the merchant and/or the merchant payment device for independent verification in the payment processing system. When the merchant payment device 14 queries the payer mobile device 18 for the payer mobile device's authentication information, in addition to providing the payer mobile device's most recent location, the payer mobile device 18 may also include information about the previous transaction, if any, involving the payer identification device 16. For example, the encrypted authentication information might include one or more of the geolocation, timestamp, merchant identity or transaction amount of the previous transaction, which is data the merchant is unlikely to possess and which ties the authentication information to the current transaction. The payer mobile device 18 returns the authentication data to the merchant payment device 14 in an encrypted form not decipherable by the merchant payment device 14. The merchant payment device 14 sends to the payment processing system 12 a transaction record that includes the geolocation of the merchant payment device 14 and the encrypted authentication information provided by the payer mobile device. The process at the payment processing end is shown in the flowchart 400 of FIG. 5. At step 401, the payment processing service 12 receives the transaction record and decrypts the authentication data provided by the payer mobile device 18 (via the merchant payment device 14) (step 402). The payment processing system 12 may verify the authentication data within the payment processing system (step 403), for example by retrieving details of the previous transaction from the database 13 and comparing the details with the data provided in the transaction record. In one embodiment, the previous transaction history may be sufficient to approve the transaction, without using the location data (step 404). Alternatively, the location data may also be such that if the payer mobile device 14 is within the defined acceptable distance from the location reported by the merchant payment device 14, then the payment processing system 12 may indicate to the merchant payment device 14 that the transaction is approved. Otherwise, if the authentication data fails these or other tests the payment processing service 12 may require additional verification before being accepted. By providing additional encrypted authentication information unknown to the merchant payment device 14 and incorporating the encrypted data in the transaction record, the system can reduce the possibility of replaying the encrypted authentication information which may lead to false or fraudulent approval of the transaction.

In one embodiment, the encrypted authentication data provided by the payer mobile device 18 may be supplemented by additional encrypted data from the payer identification device 16. For example, a payer identification device 16 may be provided with geolocation capabilities, such as from an internal GPS receiver which can be provided to the merchant payment device 14 during a transaction. To reduce the possibility of replaying the encrypted authentication information, merchant payment device sends to the transaction processor a transaction record that includes the encrypted authentication information provided by the payer identification device 16, and the encrypted authentication information provided by the payer mobile device 18. The payment processing service 12 processes the transaction record, including decrypting the authentication data provided by the payer identification device 16 and payer mobile device 18. If either the payer identification device 16 or the payer mobile device 18 is outside the acceptable distance from the location reported by the merchant payment device 14, or the authentication data fails some other test, the payment processing service may seek additional verification before approving the transaction. If the payment processing service 12 checks succeed, the payment processing service 12 sends to the merchant payment device 14 a message approving the transaction.

Figure 6:
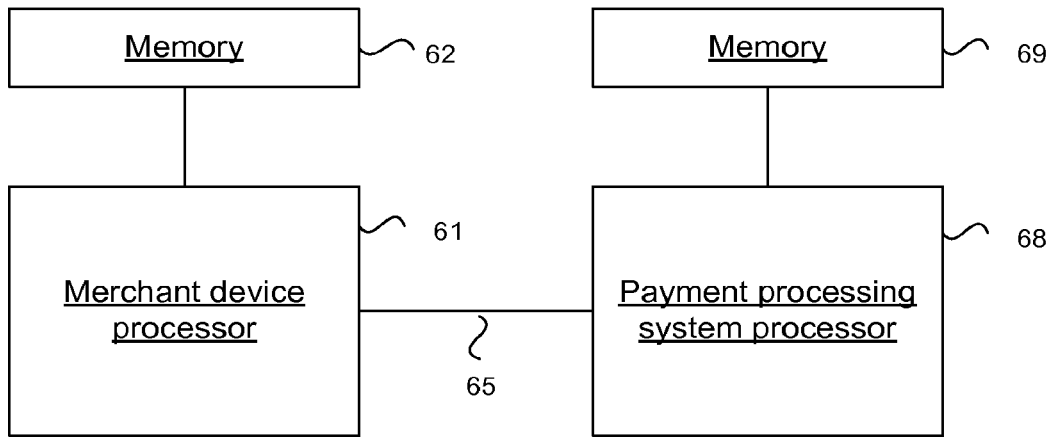
FIG. 6 illustrates a processor and memory of a merchant payment device in communication with a processor and memory of a payment processing system.
Figure 7:
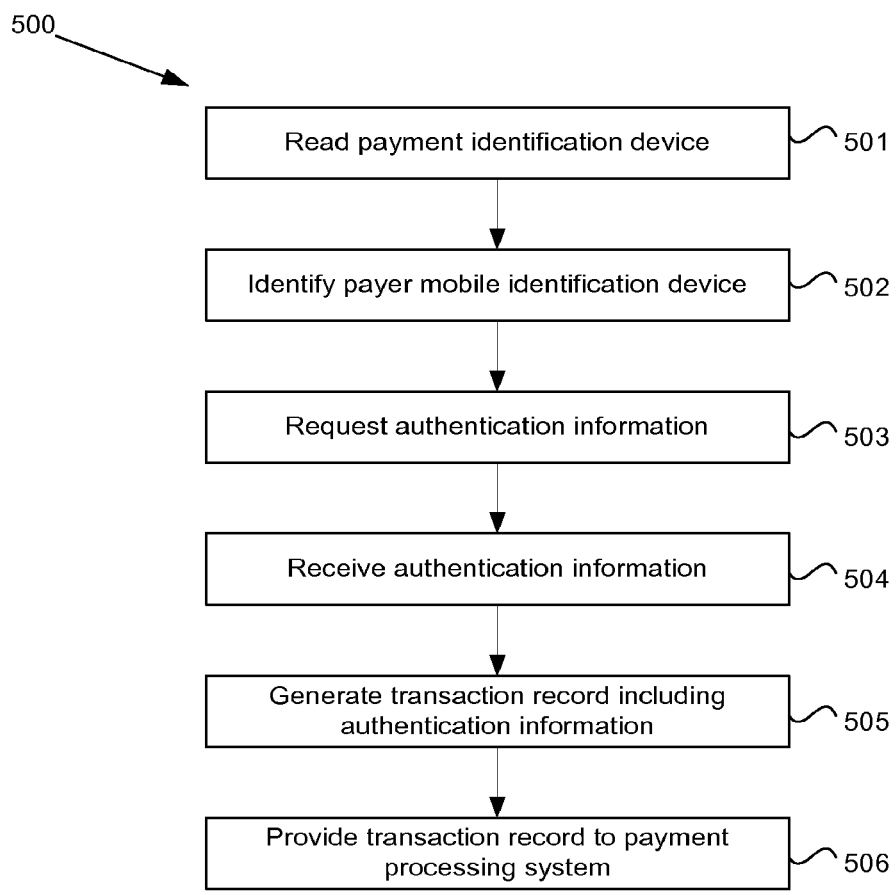
FIG. 7 illustrates an instruction set for executing on the merchant payment device processor of FIG. 6.

The components of the system 10 may be embodied in hardware, software, firmware or a combination of hardware, software and/or firmware. In a hardware embodiment, a merchant payment device may include a processor 61 operatively associated with a memory 62 as shown in FIG. 6. The memory 62 may store an instruction set 500 executable by the processor 61. When executed, the instruction set 500, shown in FIG. 7, causes the processor to commence a transaction by reading a payment identification device of a payer (step 501). After identifying a mobile communications device of the payer (step 502), a request for authentication information is sent to the mobile communications device (step 503) with the authentication information being received from the mobile communications device at step 504. The processor 61 then generates a transaction record incorporating the authentication information (step 505) and provides the transaction record to a payment processing system (step 506) for subsequent approval.

As shown in FIG. 6, the processor 61 of the merchant device may communicate the transaction record to a processor 68 and associated memory 69 of the payment processing system 12 through a suitable communications link 65. In addition, the processor 61 of the merchant device and/or the processor 68 of the payment processing system 12 may communicate with a processor and memory of a PayerMobile Device (not shown), for retrieving the required authentication information.

Embodiments of the system described above can be used to improve authorization confidence for a significant fraction of credit card uses, i.e., when the cardholder presents the physical card to a merchant and for other forms of payer identification devices. Thus, the system may be used to reduce credit card fraud by reducing the successful use of stolen credit cards, cloned credit cards, or fraudulent merchant card readers.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

The invention claimed is:

1. A method utilizing a card reader and a payment processing service, the method comprising:
   wherein the card reader includes means for extracting data including an account number or card number from a card or other payer identification device for a transactions;
   determining, using at least one Global Positioning System (GPS) receiver or other geolocation determination system, geolocation information specifying a most recent geolocation of a mobile device, wherein the most recent geolocation of the mobile device comprises a first location;

identifying, by the card reader, the mobile device corresponding to a payer based on the extracted data or from a user input;

sending, by the card reader, a request for authentication data to the mobile device or waiting for the mobile device to provide the authentication data to the card reader;

receiving, by the card reader, an encryption having embedded content therein, wherein the embedded content comprises, or is derived from, 1) a prior transaction history of the card or other payer identification device and 2) the geolocation information specifying the most recent geolocation of the mobile device;

sending, by the card reader, the encryption to the payment processing service and requesting approval, by the payment processing service, of a transaction between the card reader and the payer;

determining, by the payment processing service, approval of the transaction by the payment processing service, the approval based at least in part on the prior transaction history and whether the first location coincides, within a predefined threshold, with a second location, the second location comprising:

a location taken from a record of the card reader, or
a most recent geolocation of the card reader;

receiving, by the card reader, an indication of the approval of the transaction by the payment processing service, and completing an electronic payment in response to the payment processing service approving the requested transaction.

2. The method of claim 1, wherein the at least one GPS receiver or other geolocation determination system is integrated with the mobile device.

3. The method of claim 2, wherein the integrated receiver is in communication with a satellite system.

4. The method of claim 1, wherein the prior transaction history specifies a merchant identity or transaction amount of a completed transaction.

5. The method of claim 1, wherein the mobile device acts as the payer identification device during the transaction.

6. A system, comprising:

a geolocation determination system to output geolocation information specifying a most recent geolocation of a mobile device, wherein the most recent geolocation of the mobile device comprises a first location a merchant processing system comprising a static, or mobile, at least one point-of-sale processor, card reader means and at least one memory having instructions stored thereon that, in response to execution by the at least one point-of-sale processor, cause the at least one point-of-sale processor to perform operations including:

extracting data including an account number or card number from a card or other payer identification device for a transaction:

identifying an encryption having embedded content therein, wherein the embedded content comprises, or is derived from, 1) a prior transaction history of the card or other payer identification device and 2) the geolocation information specifying the most recent geolocation of the mobile device;

requesting approval of a transaction between a merchant and a payer;

wherein the requesting the approval includes transmitting the encryption to a payment processing service, wherein the encryption is configured to be 1) readable by the payment processing service and 2) unreadable by intermediary device(s);

receiving approval of the transaction by the payment processing service, and wherein the merchant processing system is configured to complete the electronic payment in response to an approval of the transaction by the payment processing service;

a payment processing service comprising at least one processor and at least one memory having instructions stored thereon that, in response to execution by the at least one payment processing service processor, cause the at least one payment processing service processor to perform operations including:

receiving the encryption from the at least one point-of-sale processor;

determining approval of the transaction based at least in part on the prior transaction history and whether the first location of the mobile device coincides, within a predefined threshold, with a second location, the second location comprising:

in a case that the at least one point-of-sale processor is static, a location taken from a record of the at least one point-of-sale processor system, or in a case that the at least one point-of-sale processor is mobile, a most recent geolocation of the at least one point-of-sale processor; and indicating approval of the transaction to the at least one point-of-sale processor.

7. The apparatus of claim 6, wherein the mobile device is coupled to a satellite system receiver of the geolocation determination system.

8. The apparatus of claim 7, wherein the satellite system receiver comprises a GPS (Global Positioning System) receiver.

9. The apparatus of claim 6, wherein the prior transaction history specifies a merchant identity or transaction amount of a completed transaction.

10. The apparatus of claim 6, wherein the mobile device acts as the payer identification device during the transaction.

11. The method of claim 1, wherein:

the at least one GPS receiver or other geolocation determination system comprises a plurality of GPS receivers or other geolocation determination systems;

the obtained geolocation information comprises an output of a first GPS or other geolocation determination system of the plurality of GPS receivers or other geolocation determination systems; and the most recent geolocation of the card reader comprises an output of a second different GPS or other geolocation determination system of the plurality of GPS receivers or other geolocation determination systems.

12. The method claim 1, further comprising generating the encryption, wherein the received encryption is not readable by the card reader.

* * * * *